United States Patent [19]
Gropper et al.

[11] Patent Number: 5,756,627
[45] Date of Patent: May 26, 1998

[54] HIGH MOLECULAR WEIGHT HOMOPOLYMERS AND COPOLYMERS OF ETHENE

[75] Inventors: Hans Gropper, Limburgerhof; Guido Funk, Worms; Erich Kolk, Bad Durkheim; Dieter Oeder, Weisenheim, all of Germany

[73] Assignee: BASF Aktiengesellschaft, Ludwigshafen, Germany

[21] Appl. No.: 954,429

[22] Filed: Sep. 30, 1992

Related U.S. Application Data

[62] Division of Ser. No. 599,873, Oct. 19, 1990, Pat. No. 5,189,123.

[51] Int. Cl.$^6$ .................................................. C08F 10/02
[52] U.S. Cl. ............................................................. 526/352
[58] Field of Search ..................................................... 526/352

[56] References Cited

U.S. PATENT DOCUMENTS

| | | | |
|---|---|---|---|
| 3,714,135 | 1/1973 | Pfannmueller et al. | 526/352.3 |
| 3,817,970 | 6/1974 | Mueller-Tamm et al. | 526/352 |
| 4,076,919 | 2/1978 | Urban et al. | 526/64 |
| 4,110,523 | 8/1978 | Schweier | 526/352 |
| 4,113,933 | 9/1978 | Schweier | 526/352 |
| 4,175,170 | 11/1979 | Schweier et al. | 526/352 |
| 4,728,703 | 3/1988 | Konrad et al. | 526/106 |
| 4,814,308 | 3/1989 | Konrad et al. | 526/105 |

*Primary Examiner*—Thomas R. Weber
*Attorney, Agent, or Firm*—Keil & Weinkauf

[57] ABSTRACT

The present invention relates to high molecular weight homopolymers and copolymers of ethene, which homopolymer or copolymer is obtained by polymerizing the monomer (s) at a temperature of from 70° to 150° C. and under a pressure of from 2 to 150 bar in contact witha chromium trioxide catalyst, (1) loading a support based on silicon dioxide with (2) either chromium trioxide or a chromium compound capable of being converted to chromium trioxide under the conditions of stage (3) below and then (3) heating the resulting intermediate in a gas stream containing oxygen, the support (1) being a special silica xerogel obtained by extracting not more than 30% of the water from a silica hydrogel by means of an alkanol, an alkanone or a mixture thereof followed by drying, comminution and fractional screening.

3 Claims, No Drawings

5,756,627

HIGH MOLECULAR WEIGHT HOMOPOLYMERS AND COPOLYMERS OF ETHENE

This is a division of application Ser. No. 07/599,873, filed Oct. 19, 1990, now U.S. Pat. No. 5,189,123.

BACKGROUND OF THE INVENTION

1. Field of the Invention

The present invention relates to a novel catalyst for the preparation of high molecular weight homopolymers and copolymers of ethene, which catalyst is obtainable by (1) loading a support based on silicon dioxide with
(2) either chromium trioxide or a chromium compound capable of being converted to chromium trioxide under the conditions of stage (3) below and then
(3) heating the resulting intermediate in a gas stream containing oxygen, the support (1) being a special silica xerogel obtained by extracting not more than 30% of the water from a silica hydrogel by means of an alkanol, an alkanone or a mixture thereof followed by drying, comminution and fractional screening, and to a process for the preparation of homo- or co-polymers using said catalyst.

2. Description of the Prior Art

Catalysts for the preparation of homo- and co-polymers of ethene are known and are described, for example, in DE-PS 2,540,278. These catalysts are chromium trioxide catalysts made with the use of a finely divided silica xerogel obtained from a spray-dried silica hydrogel after at least 60% of the water has been extracted with a $C_1$–$C_4$-alkanol, a $C_3$–$C_5$-alkanone or a mixture thereof. Olefine polymers which have been prepared using such a catalyst are easy to process on account of their low melt viscosity, but they have unsatisfactory morphological properties such as a low polyethylene bulk density and a high content of finest polymer particles.

Polymers showing better morphological properties are obtained in the proposal described in DE-OS 3,640,802, which makes use of a support material having a very narrow particle size distribution. Polymers obtained according to this proposal have a high molecular weight but not a high bulk density. Moreover, the preparation of the catalyst is difficult due to the required narrow particle size distribution.

DE-OS 3,634,534 and DE-OS 3,640,803 describe a combination of chromium trioxide catalysts with lithiumalkyl co-catalysts. Again, these processes do not achieve sufficiently high bulk densities, particularly in the case of high molecular weight polyethylenes showing a high degree of toughness. Another drawback is that metalalkyl co-catalysts demand special storage and metering means, which makes the process expensive.

It is an object of the present invention to provide a catalyst which makes it possible to manufacture high molecular weight olefine polymers having the combined properties of high toughness, good processibility and optimum polymer morphology.

This object is achieved by the use of a chromium trioxide catalyst of which the support comprises a special silica xerogel obtained by extracting not more than 30% of the water from a silica hydrogel by means of an alkanol, an alkanone or a mixture thereof followed by drying, comminution and fractional screening.

DESCRIPTION OF THE PREFERRED EMBODIMENTS

The present invention relates to a process for the manufacture of a supported catalyst for the polymerization of α-olefines, which comprises (1) loading a support based on silicon dioxide with
(2) either chromium trioxide or a chromium compound capable of being converted to chromium trioxide under the conditions of stage (3) below and
(3) keeping this at a temperature of from 400° to 1,100° C. for from 10 to 1,000 minutes in an anhydrous gas stream containing oxygen in a concentration of more than 10% v/v wherein the support (1) is prepared by (1.1) introducing a sodium or potassium waterglass solution into a swirled stream of aqueous mineral acid in both longitudinal and tangential directions thereto, spraying drops of the resulting silicic hydrosol into a gaseous medium and allowing them to solidify to form the hydrogel and washing the resulting hydrogel to free it from salts before ageing commences,
(1.2) extracting not more than 30% of the water contained in the hydrogel by means of a $C_1$–$C_4$-alkanol, a $C_3$–$C_5$-alkanone or a mixture thereof,
(1.3) drying the hydrogel until no more loss of weight occurs at 180° C. under a vacuum of 10 torr, thus causing xerogel formation, and
(1.4) milling and fractionally screening the resulting xerogel.

The invention further relates to a process for the preparation of high molecular weight ethene homopolymers and ethene copolymers containing mi- nor quantities of copolymerized $C_3$–$C_{12}$-α-monoolefines and to said homo- and co-polymers.

The components used in the synthesis of the catalyst and the process parameters are explained in greater detail below.

Stage (1):

(1.1) The manufacture of the synthesis component (1) is carried out in three or four steps and commences with the preparation of a silica hydrogel as described in DE-PS 2,540,278, according to which the starting material is a substantially spherical silica hydrogel containing from 10% to 25% w/w of solids (calculated as silicon dioxide) and having a particle diameter of from 1 to 8 mm, which is obtained by introducing a sodium or potassium waterglass solution into a swirled stream of aqueous mineral acid in both longitudinal and tangential directions thereto, spraying drops of the resulting silicic hydrosol into a gaseous medium and allowing them to solidify to form the hydrogel and washing the resulting hydrogel to free it from salts before ageing commences.

(1.2) Not more than 30% of the water contained in said silica hydrogel is then extracted therefrom with an organic solvent selected from the group comprising $C_1$–$C_4$-alkanols, e.g. methanol, ethanol, isopropanol or t-butanol, or the group comprising $C_3$–$C_5$-alkanones, e.g. acetone or butanone, or a mixture thereof. When such extraction is carried out, from 0.1 to 30% and preferably from 1 to 20%, by weight, of the water contained in the silica hydrogel is extracted therefrom.

The extraction of water from the silica hydrogel with said solvent(s) can be carried out in conventional extraction equipment, a suitable example being a column extractor.

In order to achieve controlled extraction of specifi- cally not more than 30% of the water contained in the hydrogel, it is advantageous to add up to 50% of water to the solvent, prior to extraction, provided a single-phase mixture results. The water extraction can be restricted to a maximum of 30% by controlling the amount of liquid used, the temperature at which extraction is carried out and the extraction time.

In a preferred embodiment, no water at all is extracted is from the silica hydrogel, which is then passed directly to the drying stage (1.3), by-passing stage (1.2).

(1.3) Conversion of the silica hydrogel obtained in stage (1.1) or stage (1.2) to silica xerogel is effected by drying in conventional drying equipment. The best results are obtained when the product has a temperature of from 80° to 200° C. and is under a pressure of from 1 to 250 torr. A stream of entraining gas, for example nitrogen, can accelerate drying, particularly at relatively high pressures. Drying is complete when no further loss of weight occurs over a period of 30 minutes at 180° C./10 torr.

(1.4) The silica xerogel obtained in stage (1.3) is ground using conventional milling equipment and then subjected to screening to provide the desired fraction having a particle diameter of from 1 to 2,000 μm and preferably from 1 to 300 μm. These particles have a surface area of from 100 to 1,000 m²/g, preferably from 200 to 600 m²/g and a pore volume of from 0.5 to 1.5 cm³/g, preferably from 0.8 to 1.3 cm³/g.

Stage (2):

The supporting material (1) thus obtained is loaded with either chromium trioxide or a chromium compound capable of being converted to chromium trioxide under the conditions of stage (3), this operation being carried out in known manner, for example as described in DE-PS 2,540,278 and DE-OS 3,640,802. Loading is effected so as to give a ratio of support to chromium of from 100:0.1 to 100:10, preferably 100:0.3 to 100:3, by weight.

The preferred method is to suspend the support material (1) in a solution of chromium trioxide or a chromium compound capable of being converted to chromium trioxide under the conditions of stage (3) and to evaporate the liquid components of the mixture, e.g. alkanone or alkanol and possibly water, while the mixture is constantly agitated as evenly as possible. This is best carried out at a temperature of from 200° to 150° C. and under a pressure of from 10 to 760 torr. If the support loaded with the chromium component contains a certain amount of residual moisture, this is not critical. However, the acceptable content of volatile components in the support is not more than 20%, preferably not more than 10%, of the weight of the support. Particularly suitable chromium components are chromium trioxide and chromium hydroxide. Other suitable chromium components are soluble salts of trivalent chromium with an organic or inorganic acid, for example the acetate, oxalate, sulfate or nitrate. Particularly suitable salts with said acids are those which, on activation, completely transform to chromium trioxide. It is also possible to use chromium compounds in the form of chelates, e.g. chromium acetylacetonate.

Stage (3):

The third stage of manufacture of the chromium trioxide catalyst serves to activate it and is described for example in DE-OS 1,520,467.

The following procedure is particularly efficient in the manufacture of the present chromium trioxide catalyst. The loaded support from stage (2) is kept at a temperature of from 400° to 1,100° C., preferably 500° to 800 ° C. for from 10 to 1,000 minutes, preferably 150 to 700 minutes, in an anhydrous gas stream containing oxygen in a concentration of more than 10% v/v and is then cooled to room temperature. The resulting catalyst has a chromium content of from 0.5 to 3% w/w and preferably from 0.7 to 1.5% w/w and can be directly used for the polymerization of α-olefines.

The polymerization of α-olefines is described in a number of publications and can be carried out by any of the usual techniques, for example as a batchwise, rhythmic or continuous process, as a suspension polymerization process or as a dry-phase polymerization process in a stirred or fluidized bed. For further details, reference is made to DE-PS 1,051,004, GB-PS 841,263, EP 004,646 and U.S. Pat. No. 3,254,070. However, our novel polymerization process is especially suitable for the preparation of granular ethene homopolymers or ethene copolymers containing minor quantities of copolymerized $C_3$–$C_{12}$-α-monoolefines by polymerization of the monomer(s) at a temperature of from 70° to 150° C. and a pressure of from 2 to 150 bar.

The polymers are distinguished by a high molar mass as characterized by an intrinsic viscosity of from 3.0 to 6.0 dl/g, good toughness properties, good processibility (melt flow indices from 0.01 to 0.5 g/10 min, high-load melt flow indices from 1.0 to 20.0 g/10 min), a melt flow ratio of from 50:1 to 200:1 and very good morphological properties. The bulk iodensity is more than 460 g/l, preferably between 470 and 550 g/l. These polymers are particularly suitable for making blown tubing and in blow molding processes.

Example 1

Preparation of the support material (xerogel)

Use was made of a mixing nozzle such as is illustrated in the Figure of U.S. Pat. No. 3,872,217 and having the following specifications: diameter of the cylindrical mixing chamber formed by a tube of plastics material—14 mm; length of mixing chamber (including post-mixing zone)—350 mm. Near the closed inlet end of the mixing chamber there was a tangential bore of 4 mm in diameter to serve as inlet for the mineral acid. Another four such bores, each having a diameter of 4 mm, were provided at 30 mm intervals, as measured in the longitudinal direction of the mixing chamber, these serving to introduce the waterglass solution in the same tangential direction. The primary mixing zone thus had a length/diameter ratio of approx. 10:1. That of the following secondary mixing zone was about 15:1. The spray nozzle protruding from the exit end of the plastics tube was a slightly kidney-shaped squeezed pipe end.

This mixer was charged with 325 l/h of 33% w/w sulfuric acid having a temperature of 20° C. and a line pressure of about 3 bar and 1,100 l/h of waterglass solution prepared from commercial waterglass containing 27% w/w of $SiO_2$ and 8% w/w of $Na_2O$ by dilution with water so as to have a density of 1.20 kg/l, this also having a temperature of 20° C. and a line pressure of about 3 bar. In the mixing chamber lined with said plastics tubing there was formed, by progressive neutralization, an unstable hydrosol having a pH between 7 and 8, which resided in the post-mixing zone for about 0.1 sec. to complete homogenization thereof before it was sprayed into the atmosphere in the form of a flat jet. During its passage through the air, this jet broke up into individual drops which assumed a substantially spherical shape due to surface tension and solidified during approx. the next second of their passage through the air to form hydrogel balls. These balls had a smooth surface, were transparent, contained approx. 17% w/w of $SiO_2$ and had the following particle size distribution:

| | |
|---|---|
| >8 mm | 10% |
| 6–8 mm | 45% |
| 4–6 mm | 34% |
| <4 mm | 11%, by weight. |

The descending hydrogel balls were collected in a washing tower which was almost entirely full of hydrogel balls and in which the balls were immediately washed with weakly ammoniacal water at about 50° C. in a continuous counter-current process to remove adherent salt therefrom before ageing of the hydrogel balls commenced.

The balls were sifted to isolate those having a size of from 2 to 6 mm, which were then dried for 8 hours at 180° C. in a vacuum of 10 torr. Under these conditions, drying over a further 30 minutes produced no more loss of weight.

The dried balls were then milled, and the 1-300 pm fraction was isolated by screening.

Manufacture of the catalyst 15 kg of the above xerogel and 40 l of a 4.1% w/w solution of chromium(III) nitrate.9H$_2$O in ethanol were placed in a double cone mixer. The mixer was externally heated to 130° C. and rotated while the ethanol was evaporated off in a vacuum produced by a water jet pump.

The resulting product was heated at 600° C. for 6 hours in a bed fluidized by hot air and then cooled down. At and below 140° C., the bed was fluidized by nitrogen so as to remove traces of oxygen, which would otherwise cause problems during polymerization.

Analysis showed that the catalyst thus obtained had a chromium content of about 0.0002 mole/g.

Polymerization

This was carried out in a reactor such as is normally used for the continuous polymerization of ethene. Its reaction chamber consisted of a pipe in the form of a circle and had a capacity of 4 M$^3$. The reaction chamber was filled with a 45% w/w suspension of polymer in isobutane, which was circulated by a propeller pump so rapidly (3,000 rpm) that a turbulent flow was produced. The temperature in the reactor was kept at 106° C. Control measures were adopted to ensure a steady inflow and outflow of suspending agent of 570 kg of isobutane per hour and to keep the concentration of monomeric ethene dissolved in the suspending agent constant at 11% v/v.

Under steady-state conditions, an influx of 100 g of catalyst gave 800 kg of polymer, per hour.

The polymer had an HLMI of 2.0 g/10 min and had a high molar mass, as confirmed by its intrinsic viscosity. It had good toughness characteristics (cf. Table below), a low content of finest polyethylene particles <125 μm and a high bulk density.

from 2 to 6 mm were placed in an extraction vessel having an inlet at the top, a sieve tray and a swan-neck overflow, and 900 l of a mixture of 90 parts by weight of ethanol and 10 parts by weight of water were added so as to completely cover the balls with liquid. The mixture was then circulated via inlet and outlet for 4 hours at the rate of 80 l/h, after which the liquid was separated from the solids through the sieve tray. In this way, 20% of the water contained in the hydrogel was extracted. The product was then dried and milled as in Example 1.

(b) and polymerization was carried out at a temperature of 105° C.

At a catalyst influx rate of 100 g/h, polymer was produced at the rate of 1,000 kg/h and had properties comparable to those obtained in Example 1 (cf. Table above).

Comparative Example 1

Example 2 was repeated except that (a) 95% of the water contained in the hydrogel was extracted with pure ethanol as proposed in DE 2,540, 278 and (b) the dried xerogel was milled and screened to particle sizes between 40 and 300 μm.

Polymerization was carried out at 98° C. and gave a polymer having an HLMI of 2.0 g/10 min. At a catalyst influx rate of 100 g/h, the polymer was produced at the rate of 750 kg/h and had a significantly higher content of finest polymer particles and a much lower bulk density than in Examples 1 and 2 (cf. Table above).

Comparative Example 2

Comparative Example 1 was repeated except that polymerization was carried out at 106° C. as in Example 1.

At a catalyst influx rate of 100 g/h, the polymer was produced at the rate of 850 kg/h. Although it had a distinctly higher bulk density, its HLMI, intrinsic viscosity and toughness characteristics were not so good. In addition, the high content of finest polymer particles remained unchanged (cf. Table).

Comparative Example 3

Comparative Example 1 was repeated except that the particles of xerogel support material were milled and labo-

TABLE

|  |  | Examples | | Comparative Examples | | | | |
|---|---|---|---|---|---|---|---|---|
|  |  | 1 | 2 | 1 | 2 | 3 | 4 | 5 |
| Percentage of water extracted from support by alkanol/alkanone | [%] | — | 20 | 95 | 95 | 95 | 95 | 95 |
| Particle size of catalyst support | [μm] | 1–300 | 1–300 | 40–300 | 40–300 | 50–100 | 40–300 | 50–100 |
| Polymerization temperature | [°C.] | 106 | 105 | 98 | 106 | 99 | 102 | 102 |
| Lithiumalkyl co-catalyst |  | no | no | no | no | no | yes | yes |
| HLMI 190° C./21.6 kp (DIN 53,735) | [g/10 min] | 2.0 | 2.1 | 2.0 | 7.2 | 1.9 | 2.0 | 1.9 |
| Intrinsic viscosity (η) (DIN 53,733) | [dl/g] | 4.86 | 4.89 | 4.85 | 3.41 | 4.91 | 4.83 | 4.87 |
| Toughness −30° C. (DIN 53,448/1B) | [kJ/m$^2$] | 285 | 289 | 280 | 145 | 290 | 279 | 279 |
| Finest polym. particles <125 μm (DIN 53,477) | [%] | 0.7 | 0.6 | 2.8 | 2.5 | 1.2 | 1.1 | 1.1 |
| Bulk density (DIN 53,468) | [g/l] | 520 | 510 | 400 | 460 | 420 | 440 | 460 |

Example 2

Example 1 was repeated except that (a) in the preparation of the catalyst support, 112 kg of the spray-dried hydrogel balls screened to a diameter of riously screened to a very narrow range of particles sizes between 50 and 100 pm, as proposed in DOS 3,640,802.

At a catalyst influx rate of 100 g/h and a polymerization temperature of 106° C., the polymer was produced at the rate of 800 kg/h and had an HLMI of 1.9 g/10 min, a high intrinsic viscosity and good toughness properties, but its polymer morphology was unsatisfactory compared with Examples 1 and 2 (cf. Table).

Comparative Example 4

Comparative Example 1 was repeated except that, during polymerization, 1 g/h of n-butyllithium was metered to the reactor to act as co-catalyst, as proposed in DOS 3,634,534.

At a catalyst influx rate of 100 g/h and a polymerization temperature of 102° C., there was obtained, at the rate of 800 kg/h, a polymer having an HLMI of 2.0 g/10 min, a high intrinsic viscosity and good toughness but still unsatisfactory morphological properties (cf. Table).

Comparative Example 5

Comparative Example 3 was repeated except that, during polymerization, 1 g/h of n-butyllithium was metered to the reactor to act as co-catalyst, as proposed in DOS 3,640,803.

At a catalyst influx rate of 100 g/h and a polymerization temperature of 1020C, there was obtained, at the rate of 820 kg/h, a polymer having an HLMI of 1.9 g/10 min, a high intrinsic viscosity and good toughness characteristics. Its morphological properties were far short of the good values achieved in the process of the invention (cf. Table).

We claim:

1. An ethene homopolymer or ethene copolymer containing minor quantities of copolymerized $C_3$–$C_{12}$-α-monoolefines in granular form and having an average particle size of from 0.5 to 1.5 mm, a melt flow index (190° C./21.6 kp) of from 1.0 to 20.0 g/10 min, a melt flow ratio of from 50:1 to 200:1 and a bulk density of from 470 to 550 g/l, said homopolymer or copolymer being obtained by polymerizing the monomer(s) at a temperature of from 70° to 150° C. and under a pressure of from 2 to 150 bar in contact with a chromium trioxide catalyst, said catalyst being formed by (1) loading a support based on silicon dioxide with (2) either chromium trioxide or a chromium compound capable of being converted to chromium trioxide under the conditions of stage (3) below and (3) keeping this at a temperature of from 400° to 1,100° C. for from 10 to 1,000 minutes in an anhydrous gas stream containing oxygen in a concentration of more than 10% vv, said support (1) being prepared by (1.1) introducing a sodium or potassium water-glass solution into a swirled stream of aqueous mineral acid in both longitudinal and tangential directions thereto, spraying drops of the resulting silicic hydrosol into a gaseous medium and allowing them to solidify to form the hydrogel and washing the resulting hydrogel to free it from salts before ageing commences, (1.3) drying the hydrogel until no more loss loss of weight occurs at 180° C. under a vacuum of 10 torr, thus causing xerogel formation, and (1.4) milling and fractionally screening the resulting xerogel.

2. An ethene homopolymer or ethene copolymer as described in claim 1, wherein in preparing the support (1) not more than 30% of the water contained in the hydrogel formed in step (1.1) is extracted by means of a $C_1$–$C_4$-alkanol, a $C_3$–$C_5$-alkanone or mixture thereof.

3. An ethene homopolymer or ethene copolymer as described in claim 1, wherein the support material (1) is a xerogel having a particle size of from 1 to 2000 μm, a surface area of from 100 to 1,000 m²/g and a pore volume of from 0.5 to 1.5 cm³/g.

* * * * *

UNITED STATES PATENT AND TRADEMARK OFFICE
CERTIFICATE OF CORRECTION

PATENT NO.: 5,756,627

DATED: May 26, 1998

INVENTOR(S): GROPPER et al.

It is certified that error appears in the above-identified patent and that said Letters Patent is hereby corrected as shown below:

Title page, insert the foreign application priority data as follows:

--[30]   Foreign Application Priority Data
Nov. 23, 1989    [DE]   Germany .................. P 39 38 723.2--.

Signed and Sealed this

Eleventh Day of August 1998

Attest:

BRUCE LEHMAN

*Attesting Officer*            Commissioner of Patents and Trademarks